(12) United States Patent
McCutcheon (10) Patent No.: US 7,178,649 B2
(45) Date of Patent: Feb. 20, 2007

(54) MANUALLY ADJUSTABLE CLUTCH ASSEMBLY WITH VISUAL INDICATOR

(75) Inventor: Steven E. McCutcheon, Fort Wayne, IN (US)

(73) Assignee: Eaton Corporation, Cleveland, OH (US)

( * ) Notice: Subject to any disclaimer, the term of this patent is extended or adjusted under 35 U.S.C. 154(b) by 94 days.

(21) Appl. No.: 10/999,496

(22) Filed: Nov. 30, 2004

(65) Prior Publication Data

US 2006/0116232 A1 Jun. 1, 2006

(51) Int. Cl.
*F16D 13/75* (2006.01)

(52) U.S. Cl. ............................. 192/70.25; 192/30 W; 192/111 R (58) Field of Classification Search .............. 192/111 R
See application file for complete search history.

(56) References Cited

U.S. PATENT DOCUMENTS

| | | | |
|---|---|---|---|
| 1,016,427 A | 2/1912 | Morse | |
| 1,063,998 A | 6/1913 | Morse | |
| 1,330,965 A * | 2/1920 | White | 192/70.25 |
| 1,746,805 A * | 2/1930 | Vail | 192/105 C |
| 2,409,013 A | 10/1946 | Bodmer | |
| 2,758,691 A | 8/1956 | Palm | |
| 2,874,816 A | 2/1959 | Dehn | |
| 4,832,164 A | 5/1989 | Flotow | |
| 4,953,680 A | 9/1990 | Flotow et al. | |
| 5,238,093 A * | 8/1993 | Campbell | 192/30 W |
| 5,263,564 A * | 11/1993 | Flotow | 192/111 B |
| 5,320,205 A | 6/1994 | Kummer et al. | |
| 5,526,913 A | 6/1996 | Tarlton et al. | |
| 5,531,308 A * | 7/1996 | Gochenour et al. | 192/70.25 |
| 6,098,773 A * | 8/2000 | Blessinger et al. | 192/70.25 |
| 6,109,412 A | 8/2000 | Cole et al. | |
| 6,186,302 B1 * | 2/2001 | Drexl et al. | 192/70.25 |
| 6,302,254 B1 * | 10/2001 | Blard et al. | 192/70.25 |
| 2003/0062237 A1 * | 4/2003 | Ziegler et al. | 192/70.17 |
| 2004/0055847 A1 | 3/2004 | Hirschmann et al. | |

* cited by examiner

*Primary Examiner*—Richard M. Lorence
(74) *Attorney, Agent, or Firm*—Brooks Kushman P.C (57) ABSTRACT

A manual adjustment mechanism for a clutch is provided wherein an adjusting gear rotates an adjusting ring relative to a pressure plate that are interconnected by means of an inclined surface or a threaded surface. The adjustment gear is mounted on a shaft and is rotated manually. An externally visible indicator is provided that is based upon axial movement of the adjustment gear shaft that moves with the pressure plate and relative to the clutch housing. The adjusting gear and inclined surfaces may be locked in place between service operations by means of locking elements.

12 Claims, 6 Drawing Sheets

MANUALLY ADJUSTABLE CLUTCH ASSEMBLY WITH VISUAL INDICATOR

BACKGROUND OF THE INVENTION

1. Field of the Invention

The present invention relates to a manually adjustable clutch that may be adjusted without disassembly of the clutch assembly and that provides an externally visible indication of clutch wear.

2. Background Art

A clutch interrupts the transmission of torque from an engine to a multiple speed gear transmission. A clutch assembly has a plurality of plates with friction engaging surfaces that transmit torque when the clutch plates are compressed and stop torque transfer when pressure is released from the clutch plates. Clutches are subject to wear over time and require periodic adjustment to assure a desired clutch engagement position and optimal performance. It is difficult to determine the extent of clutch wear without disassembling the clutch with most clutch assemblies.

Automatically adjusting clutches have been developed that do not require manual adjustment by a mechanic, however, automatically adjusting clutches require complicated mechanical linkages that add cost to the clutch assembly. Automatically adjusting clutches also require additional parts that add weight and may complicate clutch operation.

Manually adjusted clutches require periodic adjustment to provide optimal performance. Currently, manually adjusted clutches may have threaded adjusting rings that interface with the threads embedded in the clutch housing. Adjusting a clutch by moving an adjusting ring relative to a clutch assembly cover may change the orientation of a diaphragm spring within the clutch. The force required to release the clutch is governed by the orientation, or angle, of the diaphragm spring. The orientation of the diaphragm spring at the new, or original, position provides the lowest release load. One of the purposes of adjusting the clutch is to reorient the diaphragm spring to its original position. A gear may be provided that engages gear teeth on an inner diameter of an adjusting ring. The gear may be rotated to drive the adjusting ring and turn the adjusting ring relative to the clutch cover on threads provided between the clutch cover and the adjusting ring. An example of this type of a clutch adjustment mechanism is disclosed in U.S. Pat. No. 4,832,164.

The adjustment mechanism described in the '164 patent does not provide an externally perceptible visual indication of the extent of clutch wear. The adjustment mechanism also does not indicate during the adjustment process if the clutch has been adjusted to a position corresponding to a new clutch installation.

These and other problems and disadvantages are addressed by applicant's invention as summarized below.

SUMMARY OF THE INVENTION

According to one aspect of the present invention, a manually adjustable clutch assembly have a wear indicator is provided. The clutch assembly includes a housing in which a plurality of clutch plates are disposed that are shifted in an axial direction between an engaged torque transferring position and a disengaged non-torque transferring position. A pressure plate is moveable relative to the clutch in the axial direction. An adjusting ring having a first inclined portion that engages a second inclined portion on the pressure plate. A clutch release system has a diaphragm spring and an axially shifted release bearing assembly. Pressure is applied by the diaphragm spring through a fulcrum on the adjusting ring when the clutch is engaged and pressure is relieved from the fulcrum when the release bearing assembly is shifted to shift the clutch between the engaged position and disengaged position. An adjusting gear having a shaft that engages the adjusting ring to cause the adjusting gear to move circumferentially relative to the pressure plate. When the adjusting gear moves relative to the pressure plate, the first and second inclined portions change the axial spacing of the fulcrum relative to the clutch. The adjusting gear shaft is observable and accessible from outside the housing to allow the clutch to be manually adjusted without opening the housing.

According to other aspects of the invention, the adjusting gear engages the adjusting ring on the same axial side of the diaphragm spring as the clutch. The adjusting gear is disposed on a shaft that has an axis of rotation that extends in a radial plane relative to the axial direction. The adjusting ring moves in the axial direction relative to the housing as the clutch wears and as the clutch is adjusted.

An indicator associated with the housing may indicate the extent of wear of the clutch by reference to the axial position of the shaft relative to the indicator. The indicator may be a graphical reference such as a label or placard bearing indicia that is located adjacent to the slot on the housing. The indicator may also comprise a pointer having an anchoring end secured to the housing on one side of the shaft and a distal end opposite the anchoring end. The pointer is engaged by the shaft at an intermediate location and displaced as the shaft moves within the slot. The distal end of the pointer moves to a greater extent than the shaft to provide a magnified indication of the extent of wear of the clutch.

The adjusting gear may be a gear disposed on a shaft that is retained in a hole in an axially extending flange of the pressure plate. The shaft has a tool engagement feature on an outer end that may receive a tool that is used to rotate the shaft and the gear. The tool engagement feature may move relative to a slot in the housing to provide a visual indication of clutch wear.

The adjusting ring has a plurality of gear teeth that are engaged by the adjusting gear wherein rotation of the adjusting gear causes the adjusting ring to rotate. The plurality of gear teeth may extend circumferentially around all or part of the adjusting ring. The adjusting ring, pressure plate, diaphragm spring, and housing may cooperate to shield the adjusting gear and gear teeth from foreign material. The pressure plate may have a baffle that is disposed radially inboard of the adjusting ring.

The adjusting ring has a fulcrum on the opposite axial end of the adjusting ring relative to the pressure plate. The adjusting ring moves axially relative to the pressure plate when the clutch is adjusted. The adjusting gear shaft may be visually observed from outside the housing. The pressure plate moves toward the flywheel as the clutch wears. The adjusting ring moves axially as the clutch wears and as the adjusting ring is moved relative to the pressure plate when the clutch is adjusted.

The first and second inclined surfaces may screw threads or, alternatively, may be ramp surfaces.

These aspects of the invention and other features will be better understood in view of the attached drawings and following detailed description of several embodiments of the invention.

DETAILED DESCRIPTION OF THE PREFERRED EMBODIMENT(S)

Figure 1:
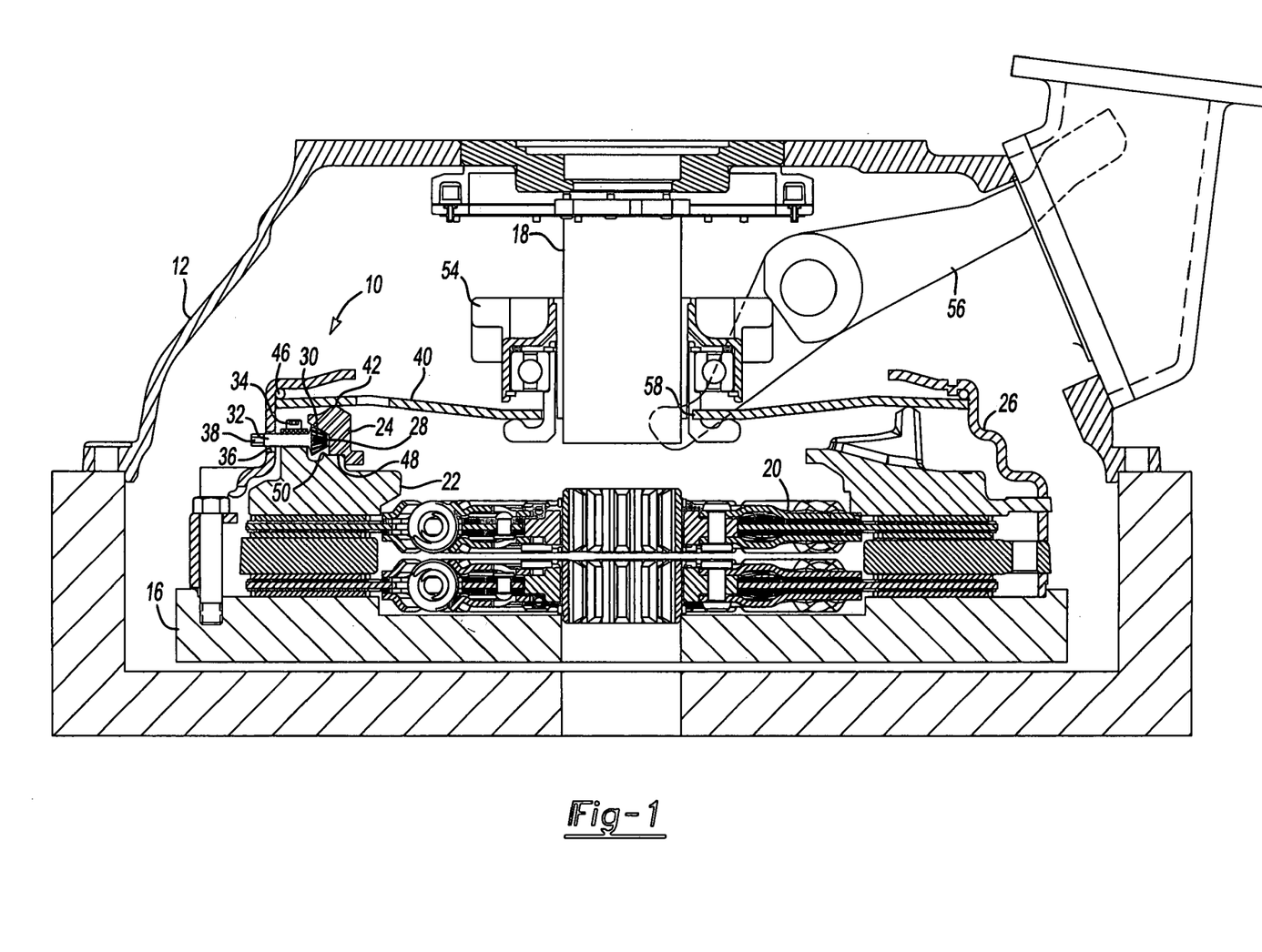
FIG. 1 is a cross-sectional view of a manually adjustable clutch assembly having an adjusting gear with a radially extending axis of rotation.

Referring to FIG. 1, one embodiment of a clutch assembly 10 is shown within a transmission housing 12. The clutch assembly 10 operatively engages the engine flywheel 16. An output shaft 18 for a multi-speed transmission receives torque from the flywheel 16 through the clutch assembly 10. A clutch pack 20 selectively engages the flywheel 16 when pressure is applied by a pressure plate 22. The same reference numerals will be used for similar parts in the several embodiments disclosed.

An adjusting ring 24 is associated with the pressure plate 22. The adjusting ring 24 is rotatably connected to the pressure plate 22 to permit adjustment of the height of the pressure plate. A clutch housing 26 is secured to the flywheel 16 and encloses the clutch pack, pressure plate 22, and adjusting ring 24. The adjusting ring 29 has a plurality of teeth 28. An adjusting gear 30 is provided to engage the teeth 28 of the adjusting ring 24 to rotate the adjusting ring 24 relative to the pressure plate 22. The adjusting gear 30 is shown is a bevel gear, however, it should be understood that other types of gears such as the spur, helical or worm gear could be substituted for the bevel gear as equivalents. The adjusting gear 30 is secured to a radially extending shaft 32. The shaft 32 is held by a retainer clamp 34 to the pressure plate 22. The shaft 32 must be rotatable within the retainer clamp 34. The shaft 32 extends through an axially extending slot 36 in the clutch housing 26. The shaft 32 has a tool engagement feature 38 such as a hex head at its exterior end.

The diaphragm spring 40 is also disposed within the clutch housing 26. The diaphragm spring 40 engages a fulcrum 42 that is formed as part of the adjusting ring 24. The diaphragm spring 40 also engages a pivot ring 46 that is mounted to the inside of the clutch housing 26. An inclined surface 48 is provided on the adjusting ring 24 that cooperates with an inclined surface 50 on the pressure plate 22. The adjusting gear 30 is turned to rotate the adjusting ring 24 relative to the pressure plate 22 to change the height of the combined pressure plate 22 and adjusting ring 24 as measured between the face of the pressure plate 22 that engages the clutch pack and the fulcrum 42. The operation of the inclined surfaces 48 and 50 will be described in greater detail with reference to FIG. 2 below.

A release bearing assembly 54 is connected to an operating lever 56 of the clutch actuator. The release bearing assembly 54 engages inner diameter 58 of the diaphragm spring 40 when the lever 56 is pivoted. The diaphragm spring 40 pivots on the pivot ring 46 to engage and disengage the clutch pack.

Figure 2:
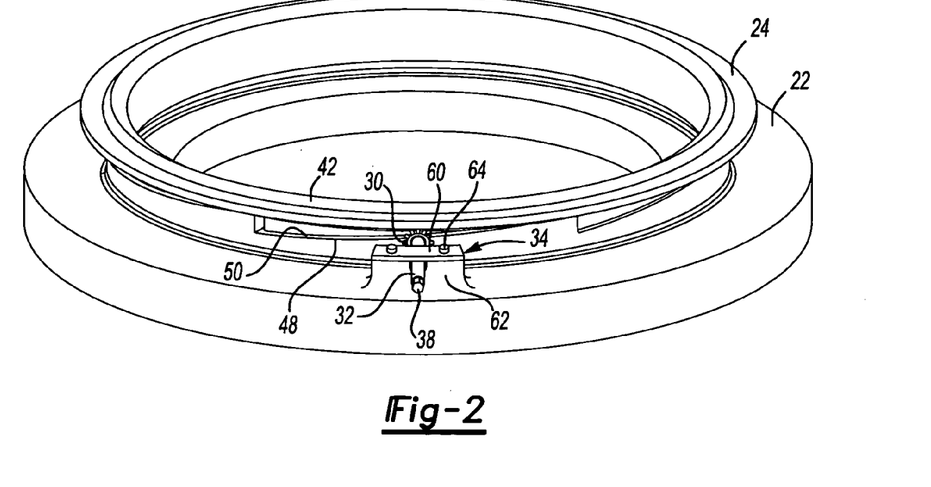
FIG. 2 is perspective view of a pressure plate, adjusting ring and adjusting gear that have a ramped connection.

Referring to FIG. 2, the adjustment mechanism is shown in isolation and in greater detail. The pressure plate 22 and adjusting ring 24 are adjusted in height by rotation of an adjusting gear 30. Adjusting gear 30 rotates the adjusting ring 24 relative to the pressure plate 22 causing the inclined surfaces 48 and 50 to shift circumferentially relative to each other. The adjusting gear 30 is secured to the shaft 32 that is retained on the pressure plate 22 by means of a retainer clamp generally identified by reference numeral 34. The retainer clamp includes a retainer plate 60 that is secured over a boss 62 formed in the pressure plate and is secured by means of fasteners 64.

Figure 3:
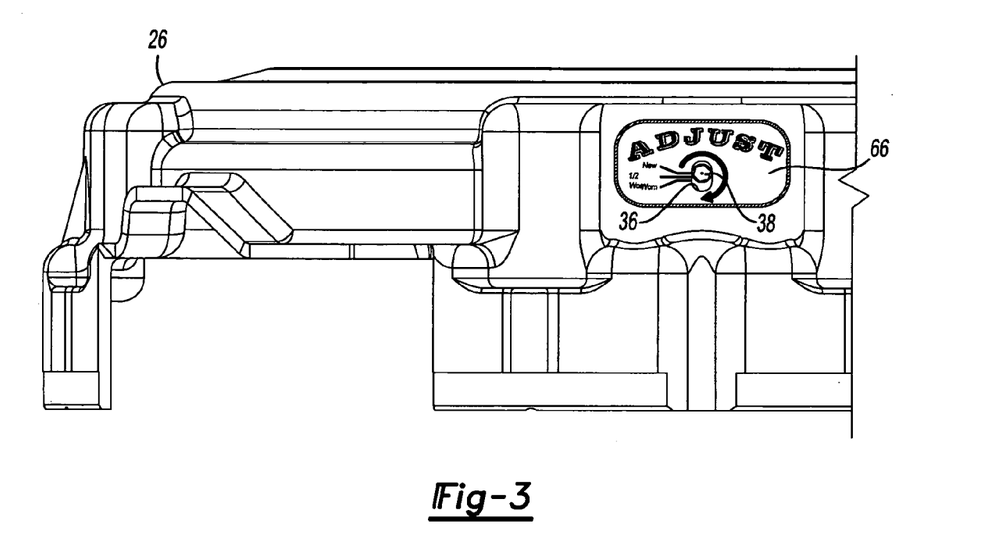
FIG. 3 is a fragmentary elevation view of a clutch assembly having an externally visible clutch wear indicator.

Referring to FIG. 3, the clutch housing 26 is shown with a placard 66 that indicate whether the clutch requires adjustment. The placard 66 has indicia such as "new," "one-half," and "worn" that are correlated with the position of the head 38 of the shaft 32 within the slot 36. A dot may be provided on the head 38 to facilitate visual observations. The shaft 32 moves with the pressure plate 22 as the clutch pack becomes worn and the shaft moves from the indication "new" to the indication "worn." When the clutch is adjusted the tool engagement head 38 is engaged by a hex head socket to rotate the adjusting ring 24.

Figure 4A:
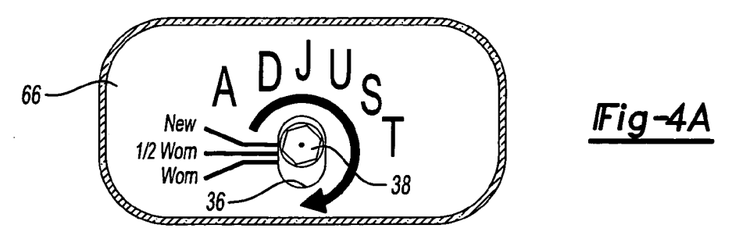
FIGS. 4A–C are a series of elevation views showing a clutch wear indicator reflecting differing extent of clutch wear.
Figure 4B:
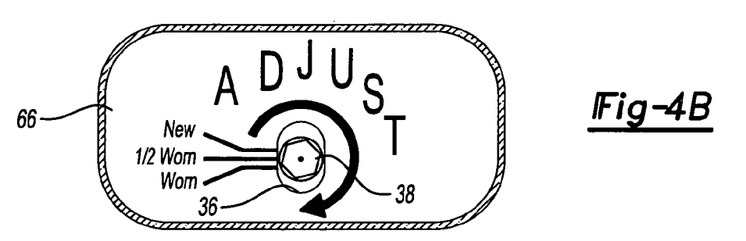
Figure 4C:
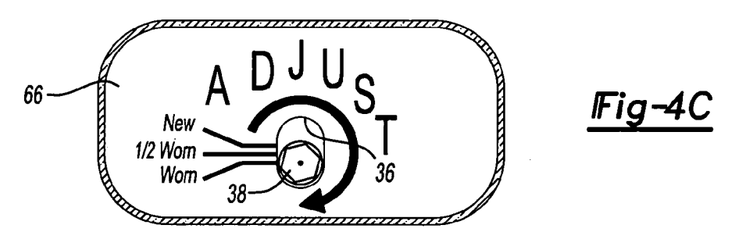

Referring to FIGS. 4A–C, a series of diagrammatic views are presented showing the relative movement of the tool engagement head 38 relative to the slot 36 and the indicia provided on the placard 66. In FIG. 4A the tool engagement head 38 is aligned with the "new" indicia reference line. When the clutch is new, the tool engagement head 38 will be in this position. Referring to FIG. 4B, the tool engagement head 38 is shown in a position corresponding the "one-half" reference line and is positioned indicating that the clutch is approximately half worn. In FIG. 4C, the tool engagement head 38 is now in the portion of the slot 36 adjacent the "worn" reference line and indicates that the clutch is worn and should be replaced.

Figure 5:
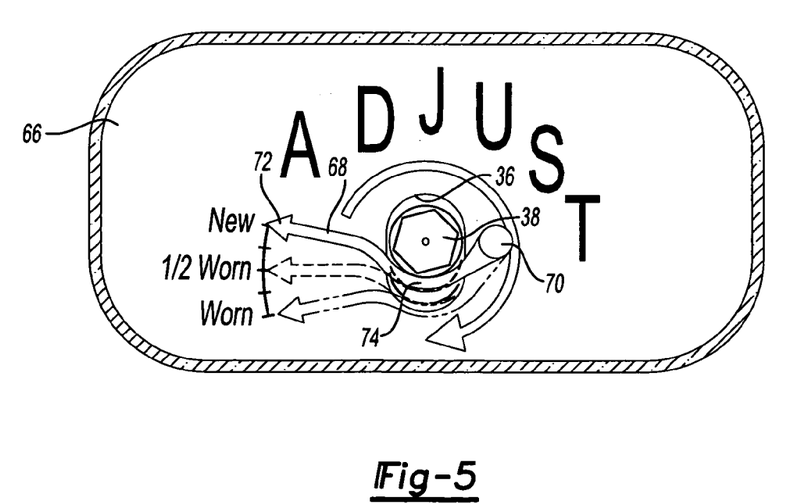
FIG. 5 is an elevation view of an alternative embodiment of a clutch wear indicator having a pointer.

Referring to FIG. 5, an alternative embodiment of an indication system is shown in which a pointer 68 is provided to magnify the indication of relative wear. The pointer 68 includes an anchor pin 70 that secures it to the placard 66. The anchor pin 70 fixes one end of the pointer 68 while allowing the distal end 72 of the pointer 68 to move between the indicia of "new," "one-half," and "worn." The intermediate portion 74 of the pointer 68 engages the shaft 32 as it moves within the slot 36.

Figure 6:
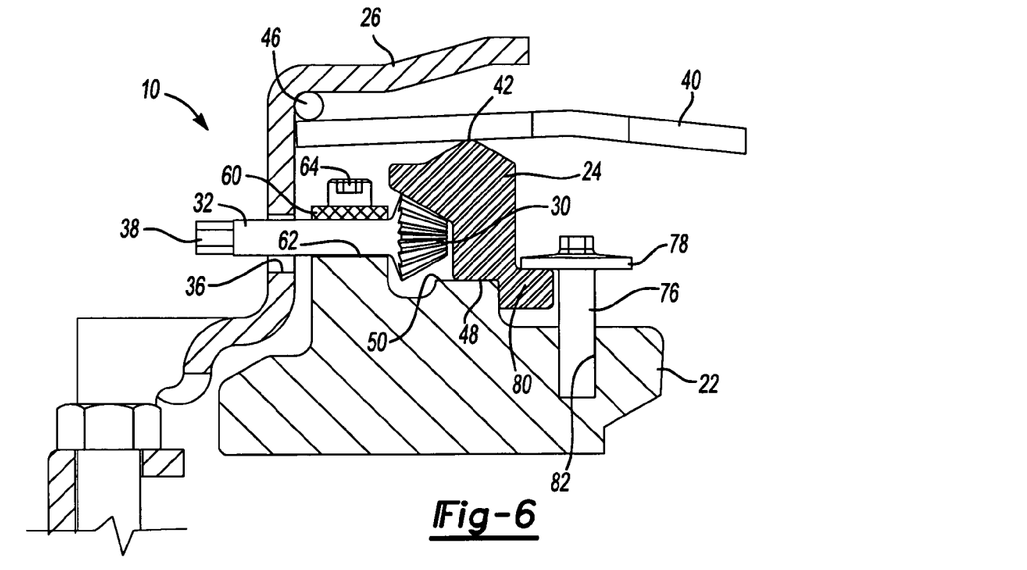
FIG. 6 is a fragmentary cross-sectional view of a clutch assembly having an adjusting gear shaft that functions as a clutch wear indicator with a locking system.

Referring to FIG. 6, an alternative embodiment of a manually adjustable clutch assembly 10 is shown. Clutch housing 26, as shown, encloses a pressure plate 22 adjusting ring 24 and diaphragm spring 40. Adjusting gear 30 is retained on the pressure plate 22 by retainer plate 60 that captures the shaft 32 within the boss 62. The adjusting gear 30 is rotated to cause the adjusting ring 24 to move circumferentially relative to the pressure plate 22 on the mating inclined surfaces 48 and 50. A lock bolt 76 having a broad shoulder 78 engages a flange 80 formed on the adjusting ring to lock the adjusting ring 24 in place. The lock bolt 76 is received in a tapped hole 82 formed in the pressure plate 22. The shoulder 78 of the lock bolt 76 engages a flange 80 to prevent movement of the adjusting ring 24 except for when the clutch is being adjusted. To adjust the clutch, it is necessary to loosen the lock bolt 76 before the turning the adjusting gear 30. After adjustment, lock bolt 76 is tightened to prevent rotation of the adjusting ring 24 as a result of inertial forces or vibration.

Figure 7:
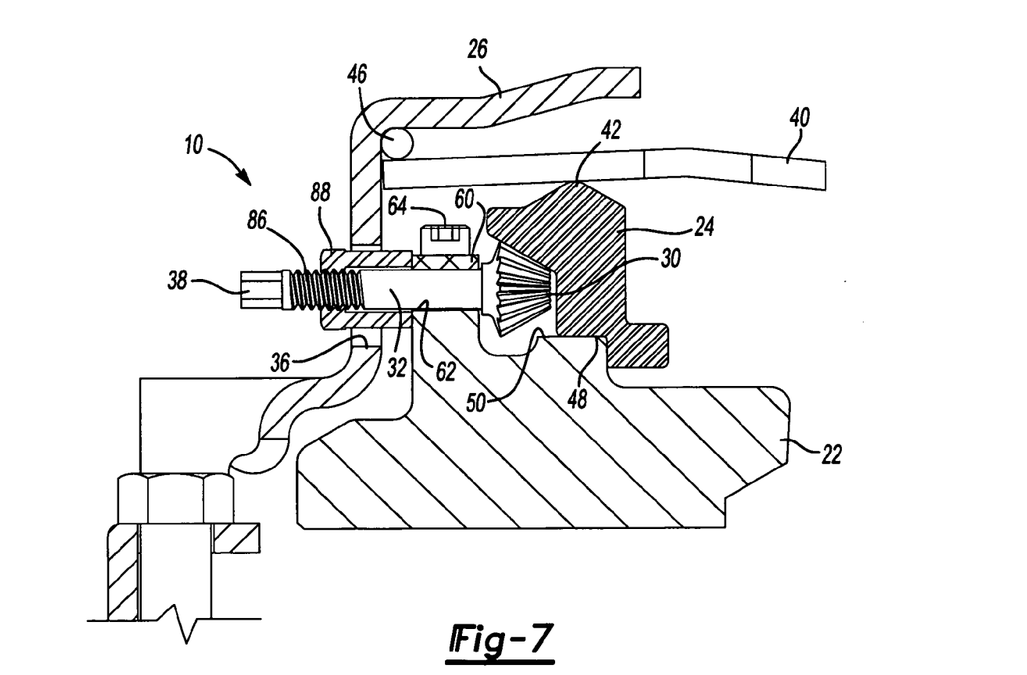
FIG. 7 is a fragmentary cross-sectional view of a clutch assembly having an adjusting gear with a radially extending axis of rotation and an adjusting gear lock.

Referring to FIG. 7, another alternative locking embodiment is shown. In this embodiment the pressure plate 22, adjusting ring 24, diaphragm spring 40 and clutch housing 26 all function in a manner similar to the previously described embodiments. The shaft 32 of adjusting gear 30 has a locking thread 86 that is engaged by a locking sleeve 88 that locks the adjusting gear 30. Locking sleeve 88 is loosened to permit to the adjusting gear 32 rotate for clutch adjustment purposes. After the adjusting gear 30 is rotated by a tool engaging the tool engagement feature 38, the locking sleeve 88 may be tightened to inhibit rotation of the adjusting gear 30.

Figure 8:
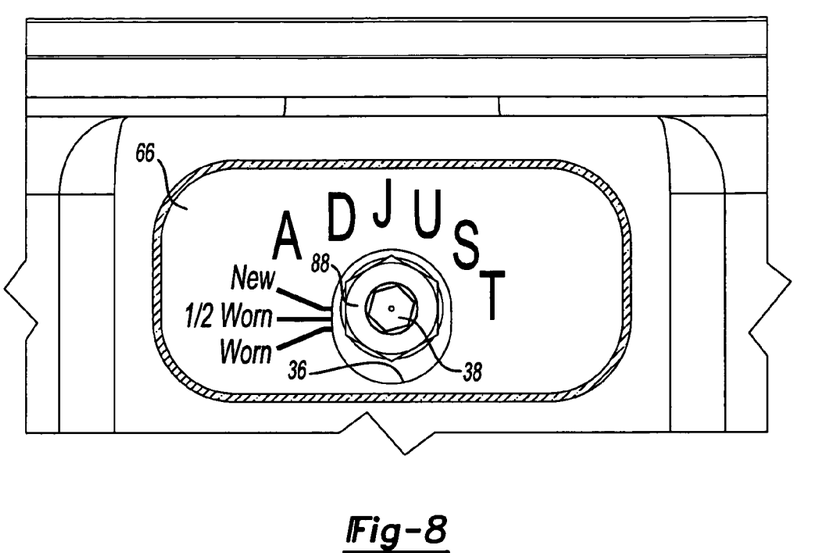
FIG. 8 is a fragmentary elevation view of an alternative embodiment of a clutch wear indicator and an adjusting gear lock.

Referring to FIG. 8, a placard 66 is shown in conjunction with the locking sleeve 88 and tool engagement feature 38. The relative degree of wear of the clutch is indicated by movement of the tool engagement feature 38 axially relative to the slot 36 between the "new" and "worn" indicia.

Figure 9:
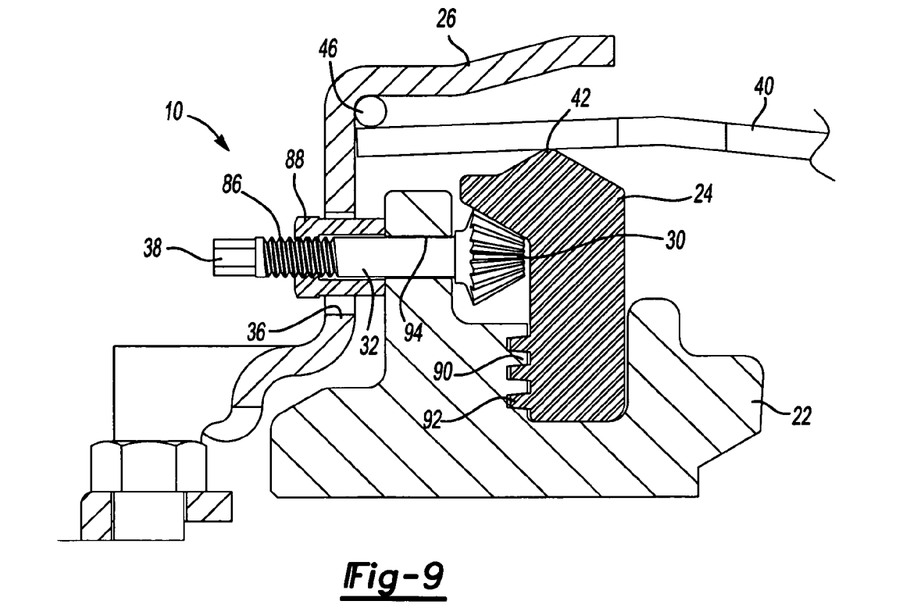
FIG. 9 is a fragmentary cross-section view of an alternative embodiment of a manually adjustable clutch assembly having an adjusting gear with a radially extending axis of rotation that rotates an adjusting ring relative to a pressure plate on a threaded connection.

Referring to FIG. 9, another alternative embodiment of a clutch assembly 10 is shown. A pressure plate 22 and adjusting ring 24 are inter-connected by an outer diameter thread 90 formed on the adjusting ring 24 and an inner diameter thread 92 formed on the pressure plate 22. Adjusting gear 30 is secured within a hole 94 formed in the pressure plate 22. The shaft 32 extends through locking sleeve 88 that is secured to the shaft by the locking thread 86. To adjust the clutch assembly 10, the locking sleeve 88 is loosened to permit the shaft 32 to rotate with the adjusting gear 30. Adjusting gear 30 engages teeth on the adjusting ring 24 to cause the adjusting ring 24 to move circumferentially relative to the pressure plate 22. As the adjusting ring 24 moves circumferentially it also shifts axially causing the distance between the fulcrum 42 and clutch engaging face of the pressure plate 22 to be increased.

Figure 10:
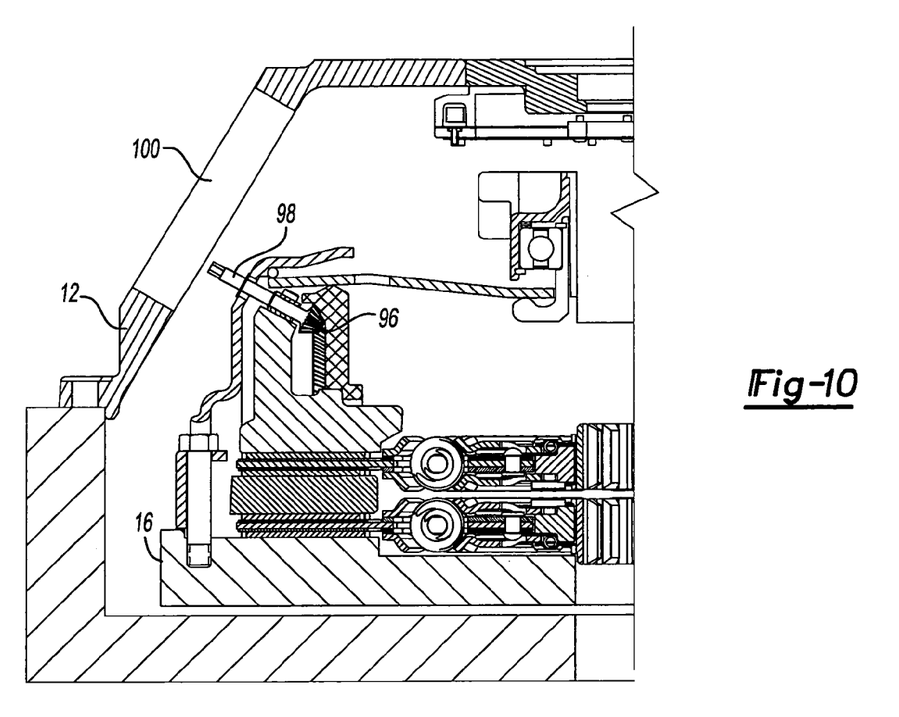
FIG. 10 is a fragmentary cross-sectional view of an alternative embodiment of a manually adjustable clutch assembly having an adjusting gear with an angularly oriented axis of rotation.

Referring to FIG. 10, an alternative embodiment is shown in which the adjusting gear 96 is attached to a shaft 98 that is oriented at a pitch angle to provide easier access for adjustment. The adjustment gear could be a bevel, spur or helical gear. The shaft 98 is angled away from the flywheel 16 to improve accessibility through an access opening 100 in the transmission housing 12. In other respects, this embodiment may function like the previously described embodiments.

Figure 11:
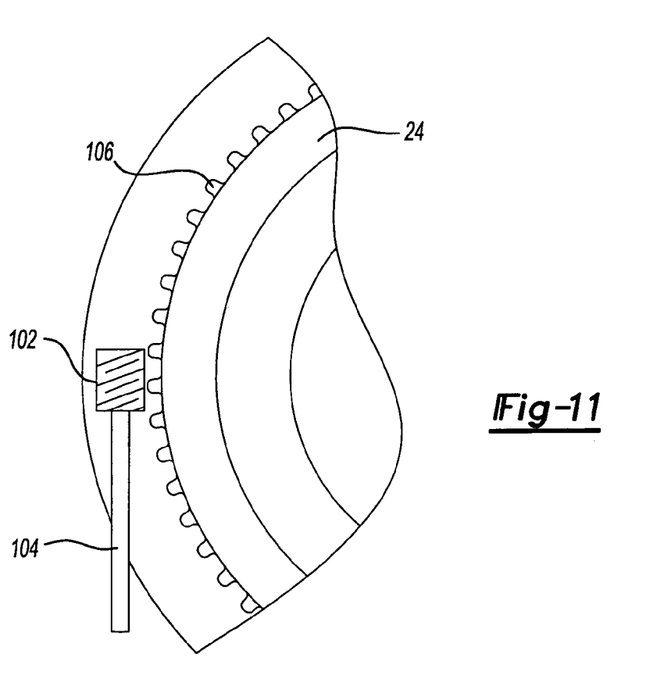
FIG. 11 is a diagrammatic view of a manually adjustable clutch assembly having a worm gear for adjusting the adjustment ring.

Referring to FIG. 11, an alternative adjustment apparatus is shown in which a worm gear 102 is used to adjust the adjustment ring 24. The worm gear 102 is attached to a shaft 104 that is oriented in a tangential plane relative to the axial direction. The worm gear 102 engages teeth 106 formed on the adjusting ring 24. The worm gear 102 could be adapted to any of the previously described embodiments.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A manually adjustable clutch assembly comprising:
   a housing;
   a clutch having a plurality of clutch plates that are shifted in an axial direction between engaged torque transferring position and a disengaged non-torque transferring position;
   a pressure plate that is movable relative to the clutch in the axial direction;
   an adjusting ring having a first inclined portion that engages a second inclined portion on the pressure plate, the adjusting ring having a fulcrum;
   a clutch release system having a diaphragm spring and a release bearing assembly which shifts axially relative to the pressure plate, the diaphragm spring engaging the fulcrum of the adjusting ring and being pivoted on the fulcrum when the release bearing assembly is shifted to shift the clutch between the engaged position and the disengaged position;
   an adjusting gear having an axis of rotation that is not aligned with the axial direction and that engages the adjusting ring to cause the adjusting gear to move circumferentially relative to the pressure plate wherein the first and second inclined portions change the axial spacing of the fulcrum relative to the clutch, the adjusting gear being accessible from the outside of the housing to allow the clutch to be manually adjusted without opening the housing, wherein the adjusting gear is provided on a shaft that has an axis of rotation that extends in a radial plane relative to the axial direction, the shaft moves in axial direction relative to the housing with the pressure plate as the clutch wears
   an indicator associated with the housing that indicates the extent of wear of the clutch by reference to the axial position of the shaft relative to the indicator, wherein the indicator is a graphical reference associated with an axially extending slot formed on the housing,
   a pointer for the indicator having an anchoring end secured to the housing on one side of the shaft and a distal end opposite the anchoring end, the pointer being displaced a first distance by the shaft as it moves within the slot and the distal end of the pointer being displaced a second distance that is greater than the first distance to provide a magnified indication of the extent of wear of the clutch at the distal end of the pointer.

2. The manually adjustable clutch of claim 1, wherein the adjusting gear engages the adjusting ring on the same axial side of the diaphragm spring as the clutch.

3. The manually adjustable clutch of claim 1 wherein the adjusting gear is disposed on a shaft that is journaled in a hole in an axially extending flange of the pressure plate and has a tool engagement feature on the outer end of the shaft that receives a tool that is used to rotate the gear.

4. The manually adjustable clutch of claim 3 wherein the tool engagement feature moves relative to a slot on the housing to provide a visual indication of the extent of wear of the clutch.

5. The manually adjustable clutch of claim 1 wherein the adjusting ring has a plurality of gear teeth that are engaged by the adjusting gear, wherein rotation of the adjusting gear causes the adjusting ring to rotate.

6. The manually adjustable clutch of claim 5 wherein the adjusting ring, pressure plate, diaphragm spring, and housing cooperate to shield the adjusting gear and gear teeth from foreign material.

7. The manually adjustable clutch of claim 1 wherein the pressure plate extends radially inboard of the adjusting ring.

8. The manually adjustable clutch of claim 1 wherein the adjusting ring defines a fulcrum on the opposite axial end thereof from the pressure plate and wherein the adjusting ring moves axially relative to the pressure plate.

9. The manually adjustable clutch of claim 7 wherein the adjusting gear is associated with an element that is visually observed from outside the housing that moves with the adjusting ring and pressure plate as the clutch wears and as the adjusting ring is moved relative to the pressure plate when the clutch is adjusted.

10. The manually adjustable clutch of claim 1 wherein the first and second inclined surfaces are screw threads.

11. The manually adjustable clutch of claim 1 wherein the first and second inclined surfaces are ramp surfaces.

12. The manually adjustable clutch of claim 1 wherein the adjusting gear is a worm gear that is attached to a shaft that is oriented in a tangential plane relative to the axial direction, wherein the shaft moves in the axial direction relative to the housing with the pressure plate as the clutch wears.

* * * * *